April 29, 1930. W. C. WRIGHT 1,756,016
WEIGHTING AND GRADING MACHINE
Filed Aug. 20, 1927 15 Sheets-Sheet 1
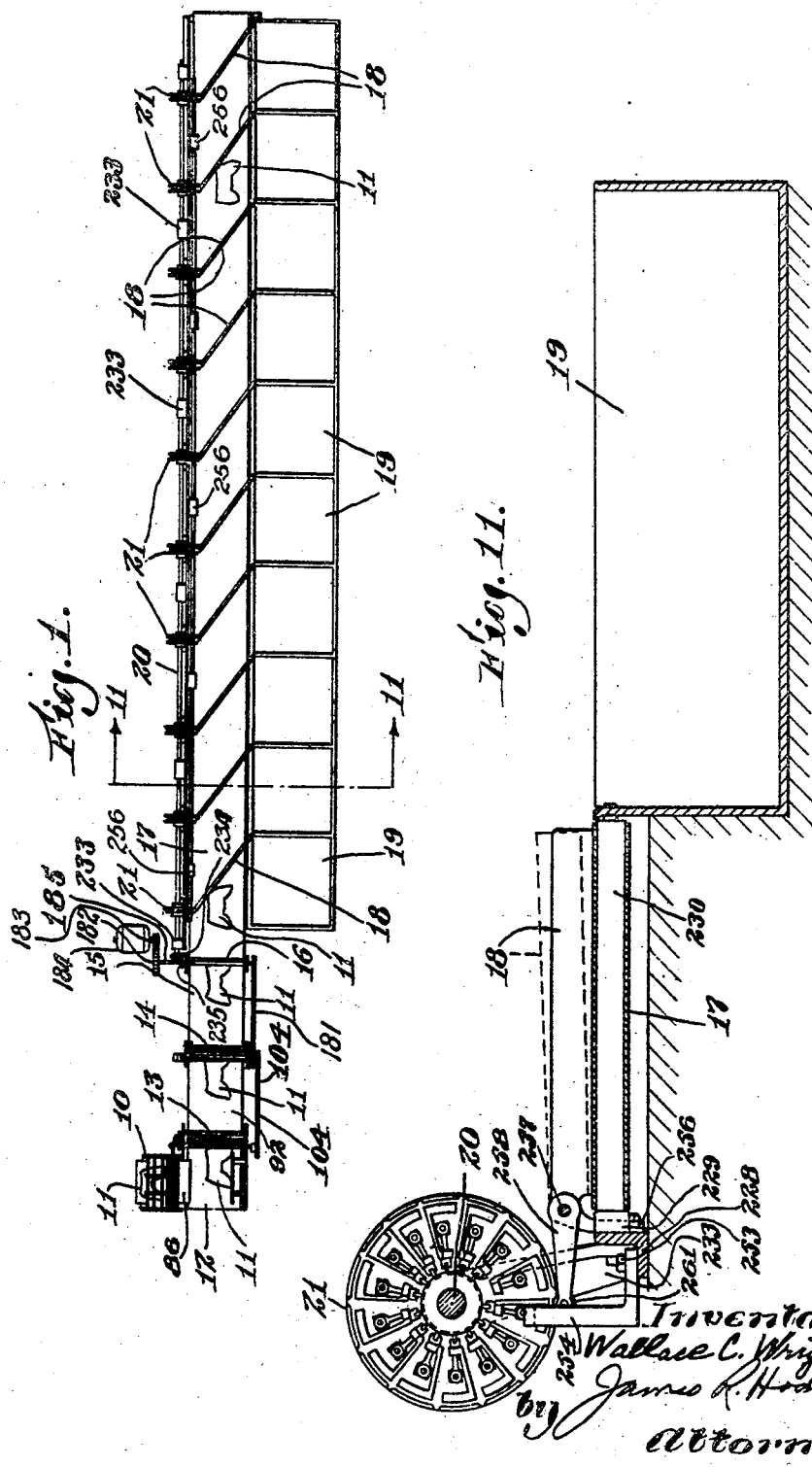

April 29, 1930. W. C. WRIGHT 1,756,016
WEIGHTING AND GRADING MACHINE
Filed Aug. 20, 1927 15 Sheets-Sheet 2
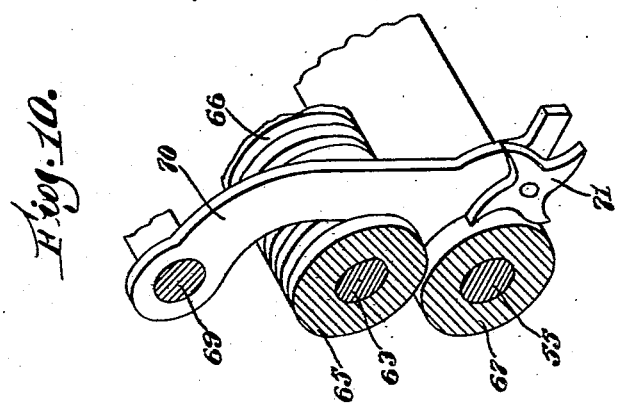
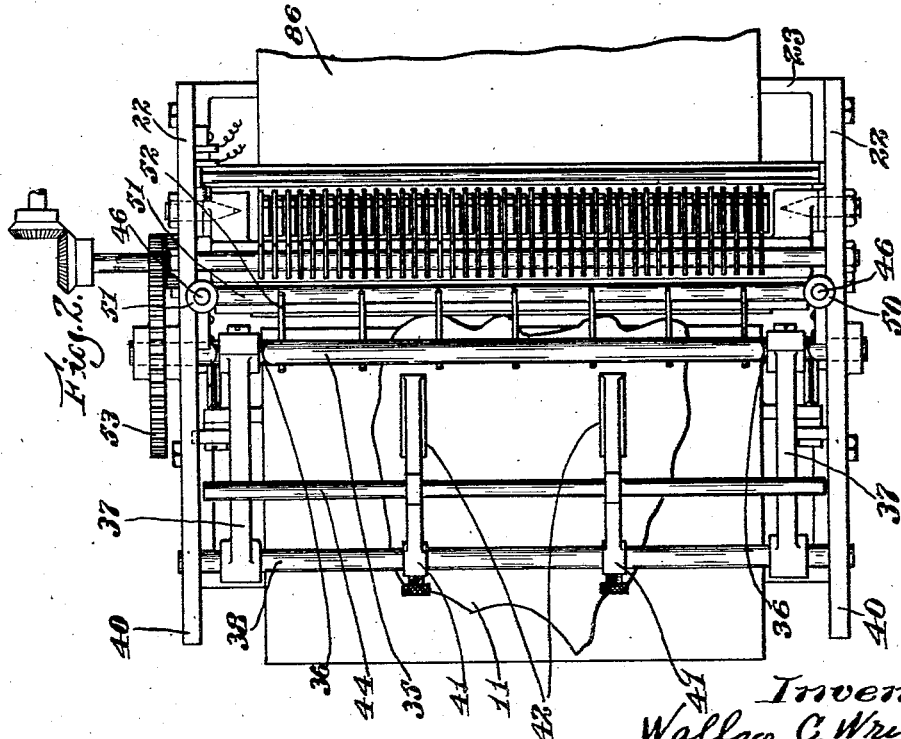
Inventor
Wallace C. Wright
by James R. Hodder
Attorney April 29, 1930.  W. C. WRIGHT  1,756,016
WEIGHTING AND GRADING MACHINE
Filed Aug. 20, 1927   15 Sheets-Sheet 3
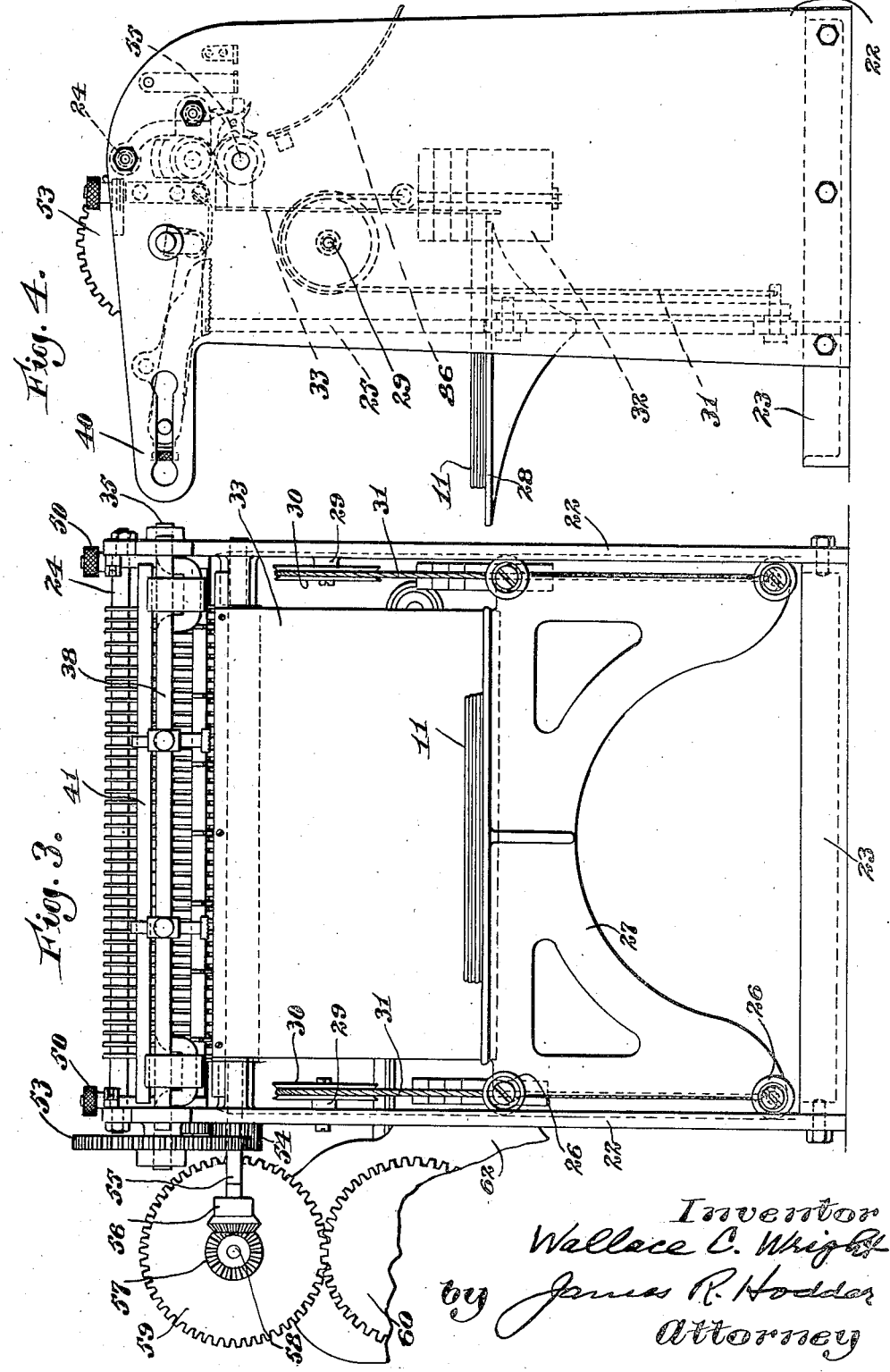
Inventor
Wallace C. Wright
by James R. Hodder
Attorney April 29, 1930. W. C. WRIGHT 1,756,016
WEIGHTING AND GRADING MACHINE
Filed Aug. 20, 1927 15 Sheets-Sheet 4
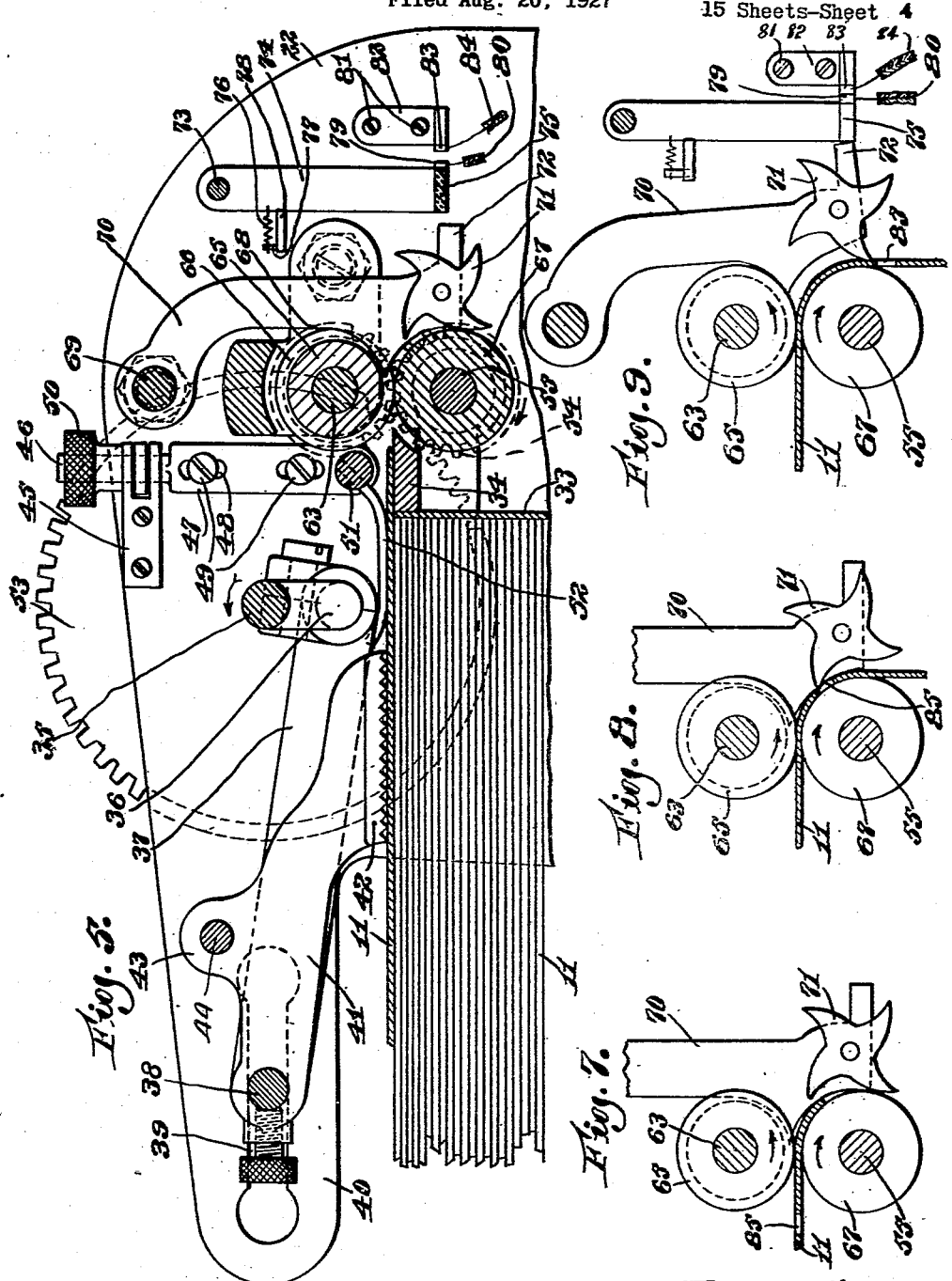
Inventor
Wallace C. Wright
by James R. Hodder
Attorney

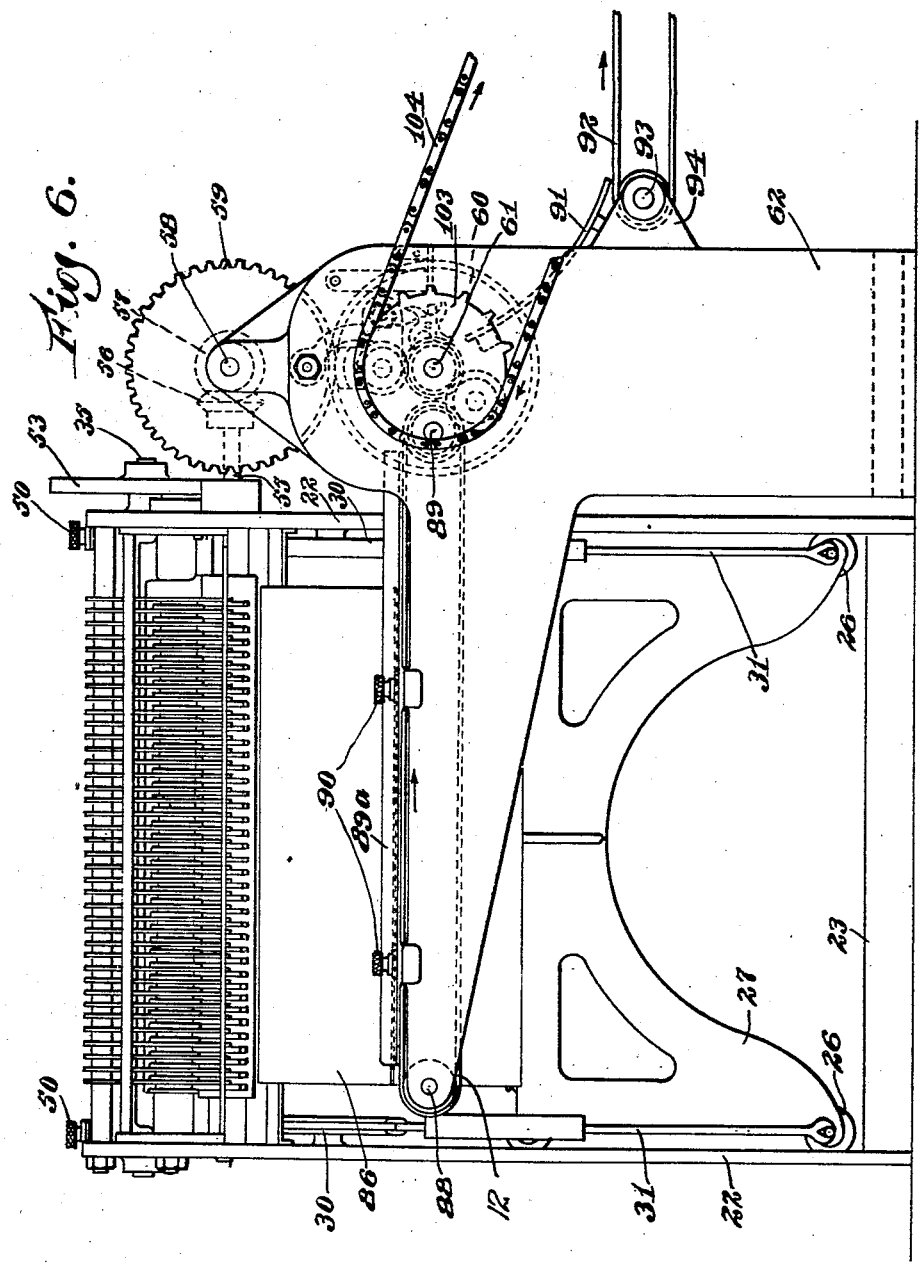

April 29, 1930.  W. C. WRIGHT  1,756,016
WEIGHTING AND GRADING MACHINE
Filed Aug. 20, 1927   15 Sheets-Sheet 6
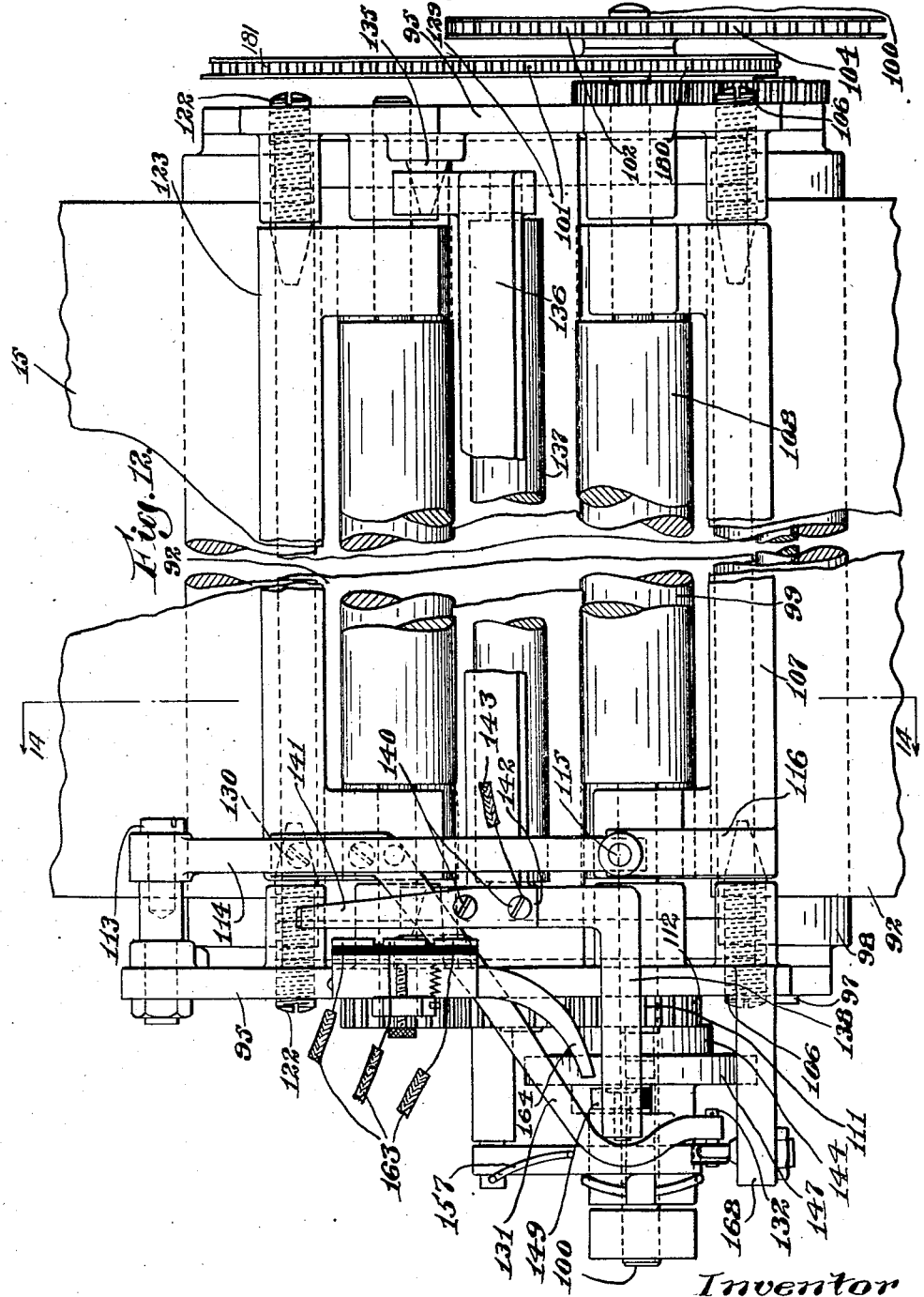
Inventor
Wallace C. Wright
by James R. Hodder
Attorney

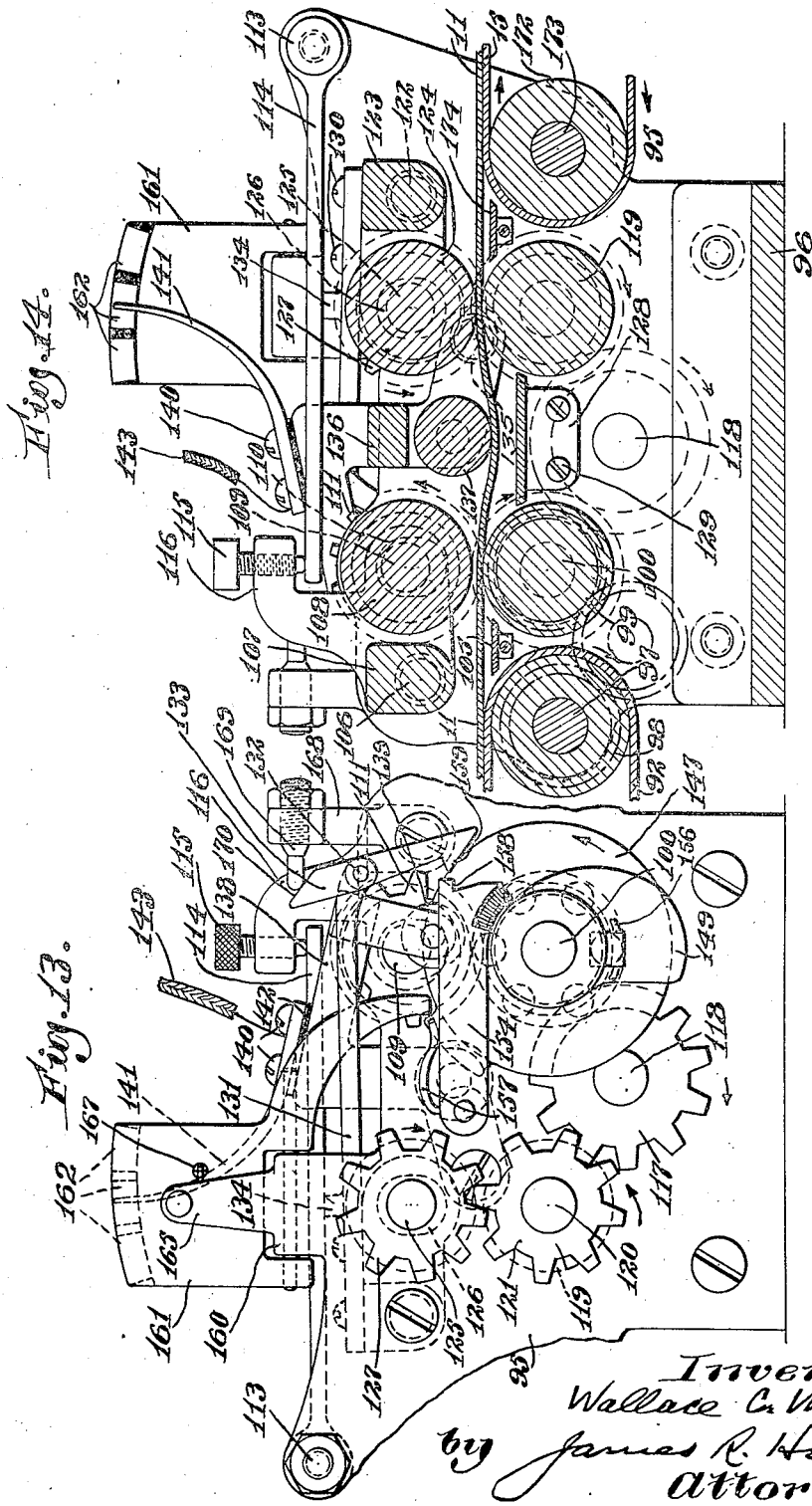

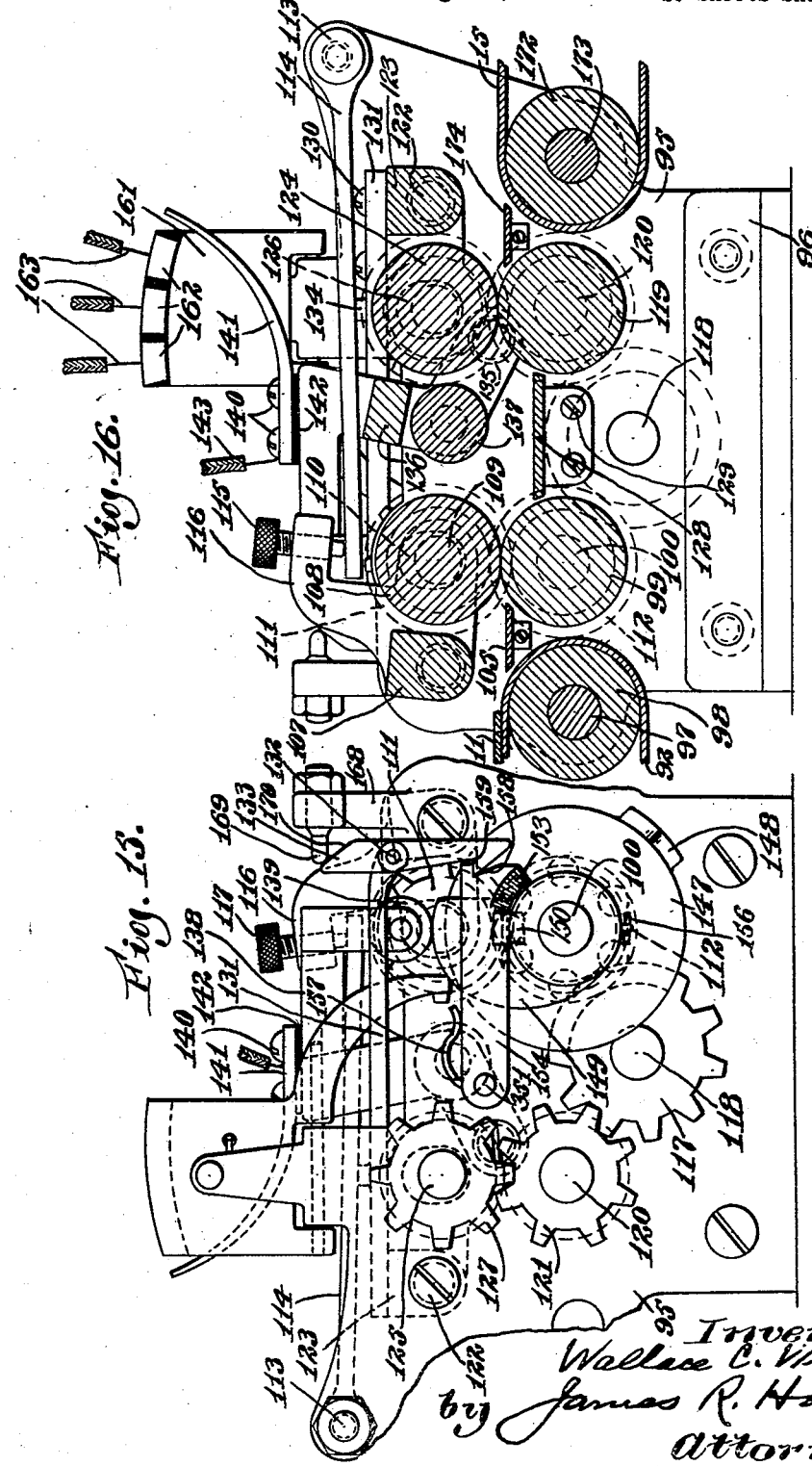

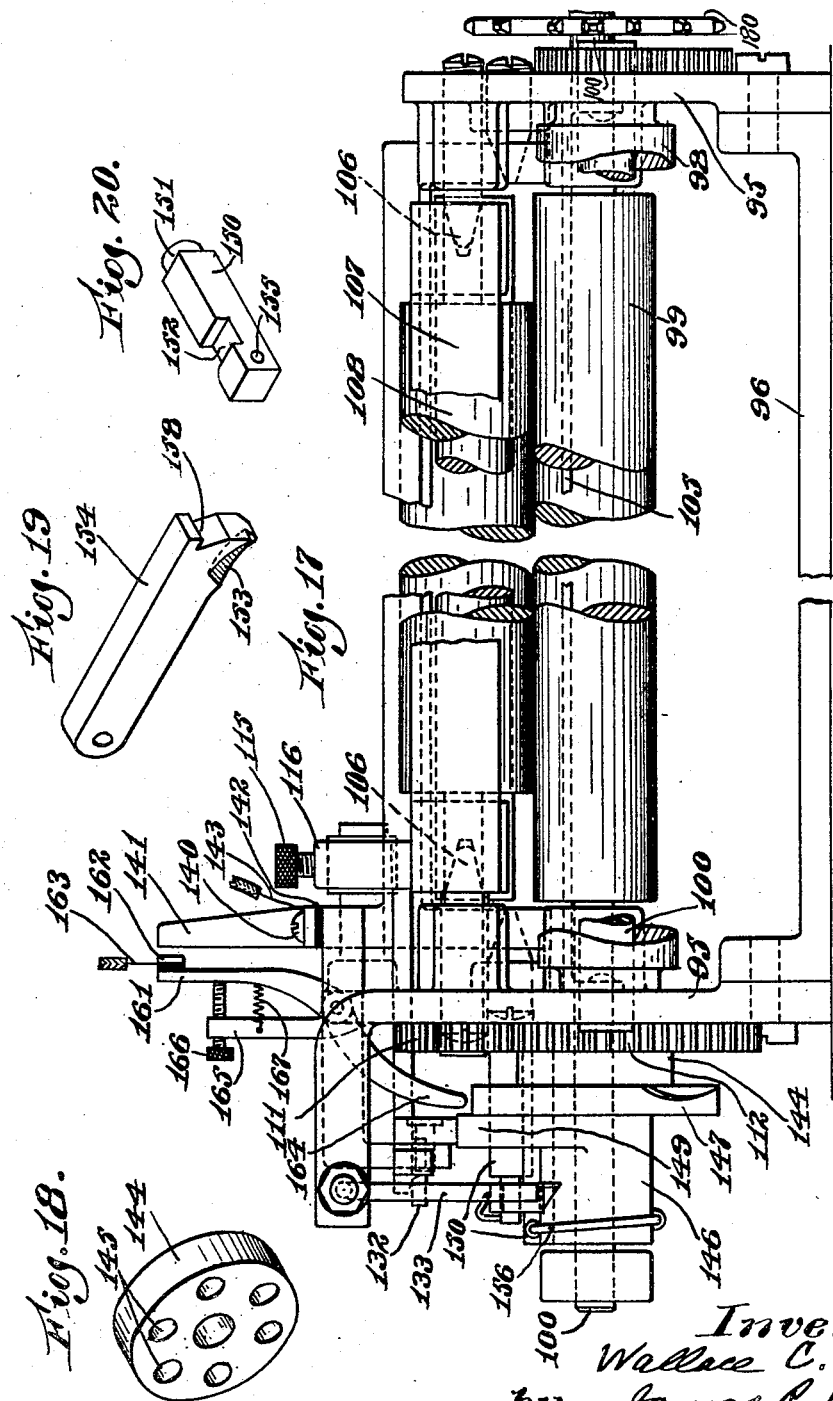

April 29, 1930. W. C. WRIGHT 1,756,016
WEIGHTING AND GRADING MACHINE
Filed Aug. 20, 1927 15 Sheets-Sheet 10
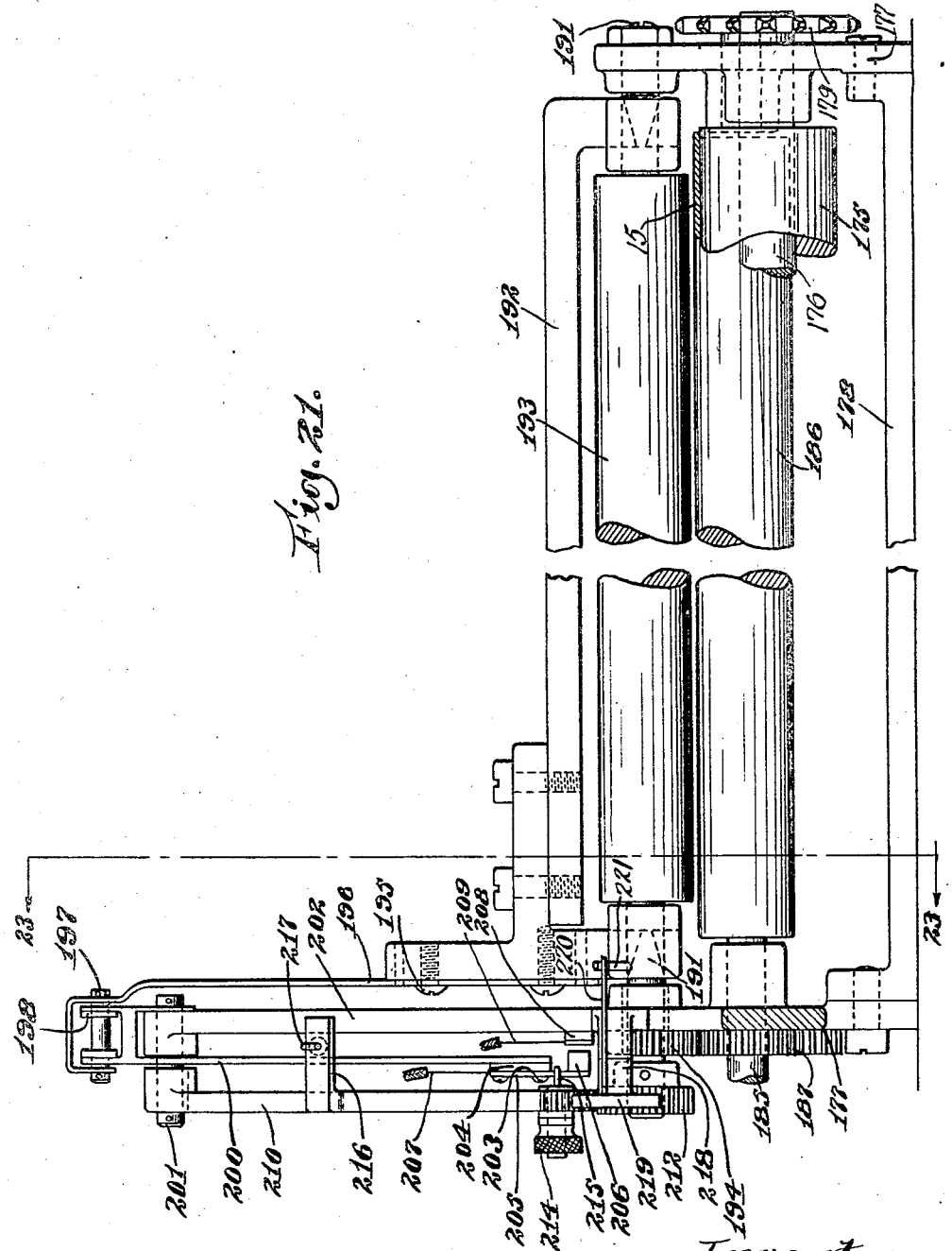
Inventor
Wallace C. Wright
by James R. Hodder
Attorney April 29, 1930. W. C. WRIGHT 1,756,016
WEIGHTING AND GRADING MACHINE
Filed Aug. 20, 1927 15 Sheets-Sheet 11
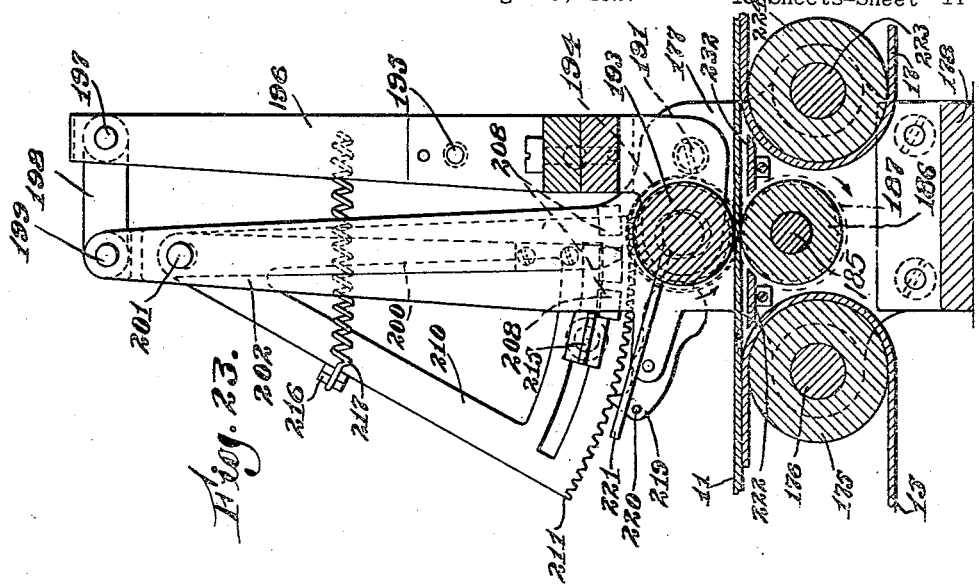
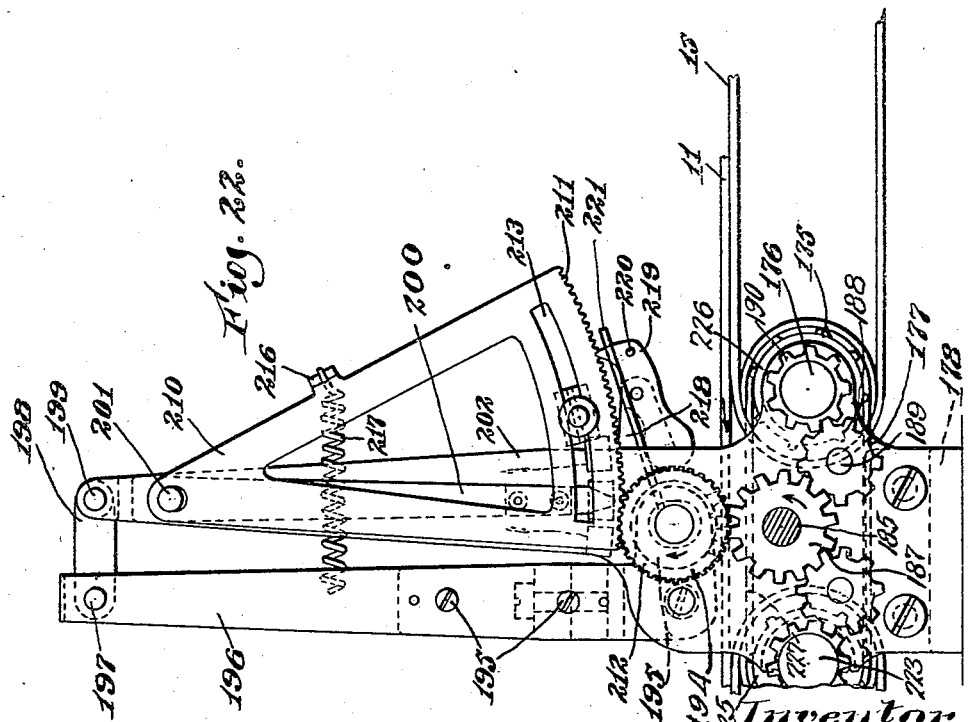
Inventor
Wallace C. Wright
by James R. Hodder
Attorney April 29, 1930.   W. C. WRIGHT   1,756,016
WEIGHTING AND GRADING MACHINE
Filed Aug. 20, 1927   15 Sheets-Sheet 12
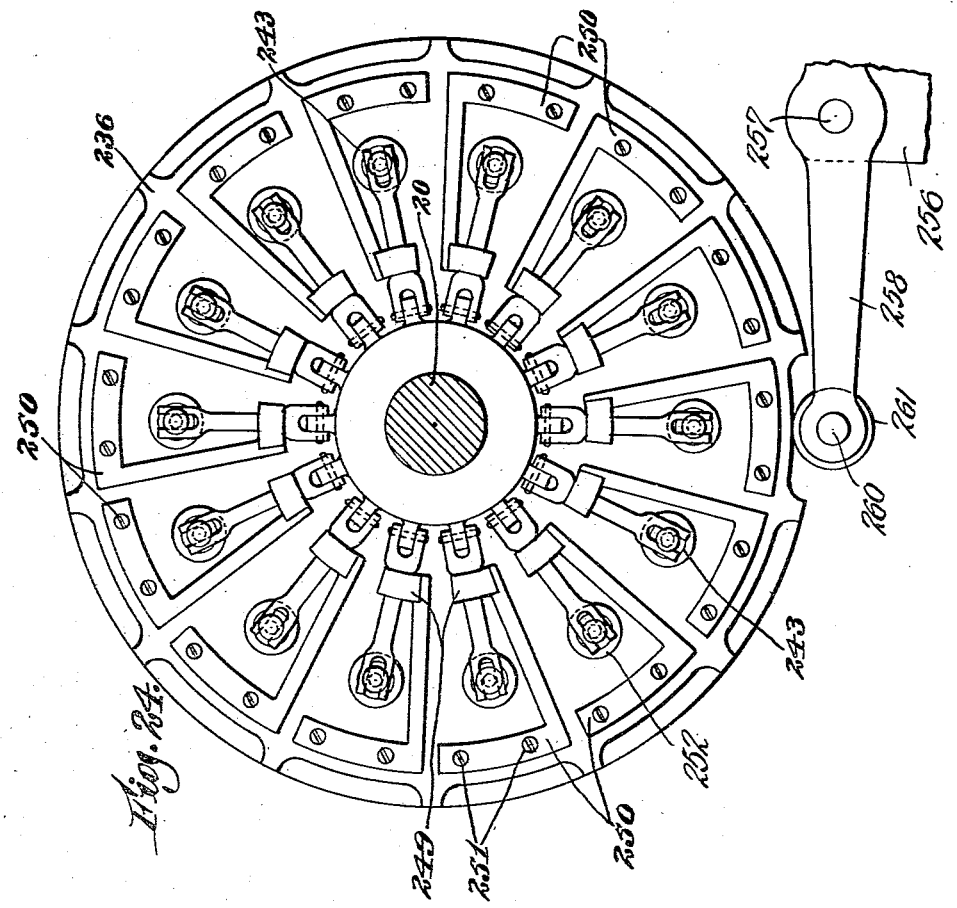
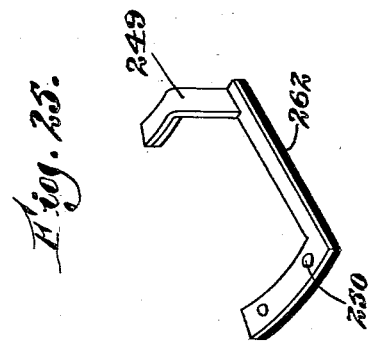
Inventor
Wallace C. Wright
by James R. Hodder
Attorney

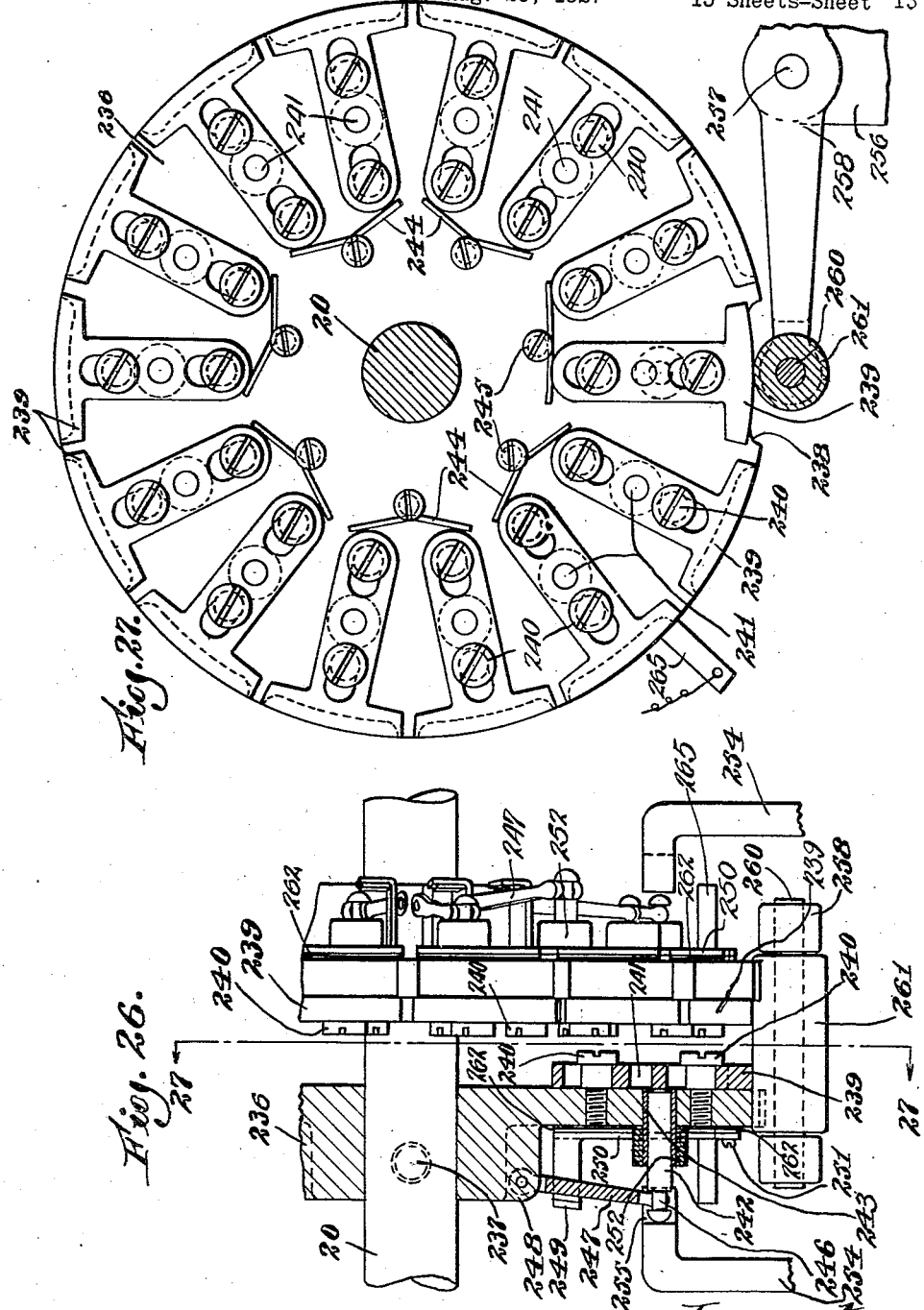

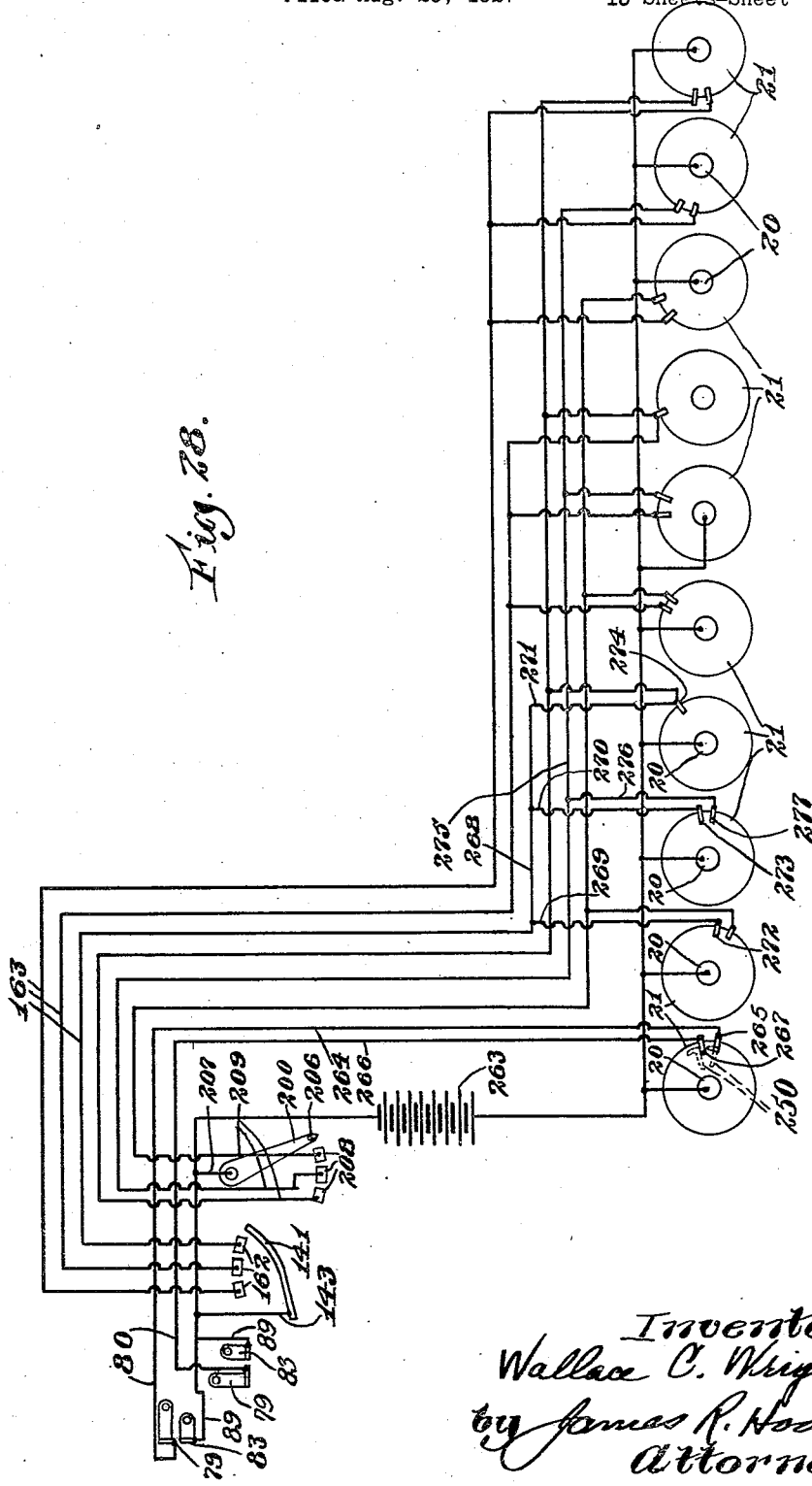

April 29, 1930. W. C. WRIGHT 1,756,016
WEIGHTING AND GRADING MACHINE
Filed Aug. 20, 1927 15 Sheets-Sheet 15

Fig. 29.

Inventor
Wallace C. Wright
by James R. Hodder
Attorney

Patented Apr. 29, 1930

1,756,016

UNITED STATES PATENT OFFICE

WALLACE C. WRIGHT, OF BROOKFIELD, NEW HAMPSHIRE, ASSIGNOR TO HARDING ENGINEERING COMPANY, OF EAST BOSTON, MASSACHUSETTS, A CORPORATION OF MASSACHUSETTS

WEIGHTING AND GRADING MACHINE

Application filed August 20, 1927. Serial No. 214,417.

My present invention relates to weighting machines and more particularly to an improved weighting machine which separates from a plurality of sheets of material, those sheets having imperfections such as holes or cuts and those ordinarily considered too soft or flexible to be graded.

In the patent granted to Dana E. Harding, No. 1,660,038 and dated February 21, 1928, there is described and claimed an improved machine for determining the weight or thickness of hides or skins, this machine being applicable to the measurement of the thickness or weight of the hide or skin as it passes under a measuring roll. In the pending application of Dana E. Harding, Serial No. 740,040, filed September 29, 1924, there is described and claimed an improved weighting machine in which the average weight or thickness of the hide may be instantaneously determined by applying to the hide or skin a plurality of thickness measuring devices all interconnected together and associated with means for determining the average movement of such measuring devices. Both of the machines referred to are adapted to work on complete hides or skins or on material having a relatively large superficial area. In both of these machines no attempt is made to reject a skin or hide if, for any reason, imperfections exist therein, such for example as holes or cuts and, therefore, imperfect skins or hides are weighted or graded with the others. Further, no attempt is made to eliminate from the first quality skins, such skins as, while perfect as regards texture, are yet too soft to be classed as commercial skins. The soft skins, while with certain classes of leather, may not be merchantable, yet with other classes of skins, form merchantable material of the highest quality and the segregation of perfect, though soft skins, is a valuable operation.

While the above machines are applicable for operating on relatively large pieces of skins, hides, or other sheet material, it is doubtful if they would be applicable to the classification or division of such hides, skins, or sheets of material into imperfect, soft, and relatively hard classes by reason of the fact that all hides or skins good, bad, and indifferent, have in some portion cuts or holes and in the commercial use of the hide or skin, such injured portion, by reason of the cuts or holes is, if possible, made up or if this is impossible, then it is thrown away. With a relatively small piece of material, however, it is essential that those pieces having holes or cuts therein be positively rejected and also, those skins that are too soft for the particular purpose desired must also be rejected although, as stated above, such soft skins in some classes of work are the kind of skins required and because they are rejected when choosing relatively hard skins, this does not mean rejected in the sense that rejected is used in connection with the pieces having holes or cuts therein. In weighting or grading relatively small pieces of hides or skins, it is desirable to segregate them into groups according to the classification adopted and I have, in my present invention, provided such collecting means.

An improved feature of my invention is the segregation from a group of pieces of skins, all those pieces which have cuts or holes therein and in carrying out this object, I pass such pieces of skins over or between rolls, said rolls being connected in an electric circuit and the circuit being only closed when the rolls are in engagement with each other. In such electric circuit is a gate operating means lying in the path of movement of the pieces of skins and said gate being positioned will sweep said piece of skin off a conveying apparatus and into a receptacle. Where the piece of skin has a hole therethrough of any appreciable extent, it is a relatively easy matter to establish a contact between the engaging rolls and those completing the circuit to operate the gate. With a cut in the skin, however, if the cut lies perpendicular or substantially perpendicular to the axis of the rolls, the presence of the cut will not be apparent and no contact between the two rolls will be established. On the contrary, if the cut lies parallel to the axis of the rolls, then when the skin passes over one of the rolls, such roll being relatively small in diameter, a gaping hole will be produced through which the rolls will project into engagement with each other. I have, therefore, in order to provide for all contingencies, utilized a plurality of pairs of contacting rolls situated at right angles or substantially so to each other, either of said pairs of rolls controlling the operation of the gate referred to.

I have also, in carrying out my invention, provided means for determining the relative degree of hardness or softness of a piece of hide or skin or other sheet material, such degree of hardness or softness being determined by the ordinary usage in this particular art. I obtain this segregation of skins into groups having predetermined degrees of hardness or softness by means of weighted rolls under which the pieces of hides or skins must pass, and the classification of such pieces of skins or hides will depend on the deflection or depression of the frame carrying the contact roller. Again, the invention contemplates the segregation into groups of pieces of hides or skins in accordance with the weight or thickness thereof, certain pieces of the hides or skins having a certain range of thickness being segregated into one group and other skins of other predetermined range of thickness into a second group, and this plan of operation may be followed out to as great a degree as is desired.

Also, it is contemplated that the means for determining the relative degree of weight or thickness of the hides or skins may be operated in conjunction with the means for determining the relative degree of hardness or softness of such skin and, therefore, it will be apparent that the groups of hides or skins into which a plurality of hides or skins having different characteristics may be segregated, will depend on the number of groups of varying weights multiplied by the number of grades into which the hides or skins are grouped according to their degree of hardness or softness.

Various other possibilities with regard to this invention will be apparent to those skilled in the art.

The accompanying drawings illustrate a preferred physical embodiment of a machine in which my invention is incorporated and in such drawings, Fig. 1 is a diagrammatic plan view;

Fig. 2 is an enlarged plan view of the feeding mechanism shown at the left of Fig. 1;

Fig. 3 is a rear or left-hand elevation of Fig. 2;

Fig. 4 is a side elevation of Fig. 2;

Fig. 5 is an enlarged side elevation of the upper portion of Fig. 4;

Fig. 6 is a front or right-hand elevation of Fig. 2;

Figs. 7, 8 and 9 show in enlarged elevation the contact mechanism for slots and cuts shown in the lower right-hand end of Fig. 5;

Fig. 10 is a perspective view of the mechanism shown in Figs. 7, 8 and 9, and the relation thereof to the operating lever;

Fig. 11 is a sectional end elevation on the line 11—11 of Fig. 1;

Fig. 12 is a plan view of the mechanism for determining the degree of hardness of the hides or skins;

Fig. 13 is a left side elevation of Fig. 12;

Fig. 14 is a sectional end elevation on the line 14—14 of Fig. 12 showing the elements in the position in which they are located in Fig. 13;

Fig. 15 is a left side elevation of Fig. 12, similar to Fig. 13 but with the parts in a different operative position;

Fig. 16 is a view on the line 14—14 of Fig. 12, similar to Fig. 14 but with the parts in the position shown in Fig. 15;

Fig. 17 is a front elevation of the mechanism illustrated in Fig. 12;

Figs. 18, 19 and 20 are perspective details of portions of the mechanism;

Fig. 21 is a front elevation of the weighting device of the machine;

Fig. 22 is a side elevation of Fig. 21;

Fig. 23 is a sectional side elevation on the line 23—23 of Fig. 21;

Fig. 24 is a side elevation of one of the gate-operating means;

Fig. 25 is a perspective view of one of the elements shown in Fig. 24;

Fig. 26 is an elevation partly in section of the mechanism shown in Fig. 24;

Fig. 27 is a sectional side elevation on the line 27—27 of Fig. 26, and

Figs. 28 and 29 are circuit diagrams showing the electrical connections and operating means for controlling and operating the distributing gates.

Referred to the drawings, and particularly to Figs. 1 and 11, there is shown in general outline a combined feeding and detecting mechanism for detecting slots or cuts in the hides or skins, such mechanism being designated generally by the numeral 10. The hides or skins or pieces of hides and skins 11 are fed from a stack through the feeding rolls and through the indicating or detecting mechanism onto a conveyor 12, which feeds them at right angles to the line of their former travel and will feed therethrough a detecting mechanism 13 similar in operation and function included in the mechanism designated generally by the reference numeral 10. The hides or skins 11 passing through the mechanism 13 will now pass through a detecting mechanism 14, which will determine the degree of hardness or softness of the skins and after this has been performed, the hides or skins 11 pass along a conveyor 15 and through a weighting mechanism 16, from which they are fed onto an endless conveyor 17 passing under a plurality of pivotally mounted gates 18 and alongside a plurality of bins 19, such bins being variously designated as "Holes and cuts", "Soft one, weight one", "Soft one, weight two", etc. The various conveyers 12, 15 and 17, as well as a shaft 20 lying parallel to the conveyor 17 and on the side thereof opposite the bins 19 are all operated in timed relation and simultaneously with each other. On the shaft 20 at various intervals therealong and associated with the pivotally mounted gates 18, are controlling devices designated generally by the reference numeral 21 and which controlling and operating means are electrically positioned or placed in action by the various mechanisms 10, 13, 14 and 16. The pivotally mounted gates 18 occupy normally the dotted position shown in Fig. 11, so that a piece of hide or skin 11 passing along the conveyor 17 will be moved from left to right in Fig. 1 without interference with or by the gates 18. If, for example, a piece of hide or skin 11 is found by the mechanism 10 or 13 or 10 and 13 to have therein cuts or holes, a circuit will be closed which will set the mechanism 21 that will, at the proper instant, drop the first gate 18 onto the endless conveyor 17, where it will occupy the position shown in Fig. 11 and the piece of hide or skin 11 moving along with the conveyor 17, will engage with such gate 18 and will be moved laterally of the conveyor 17 into the bin 19 marked "Holes and cuts". The first mechanism 21 is a single mechanism and is operated only by one or both of the mechanisms 10 and 13. If, however, a piece of hide or skin 11 does not have holes or cuts therein, it will pass through the mechanism 10 and 13 without any effect on the electrical circuits controlled thereby and will pass under or through the mechanism 14 that determines the degree of hardness or softness thereof. If now the piece of hide or skin passing through the mechanism 14, is of a softness No. 2, a break point in the circuit will be closed for the 4th, 5th and 6th mechanisms 21, counting from the right-hand end of Fig. 1, although, at this time, nothing will happen. The hide or skin passing through the mechanism 14 will be carried by the endless conveyor 15 through the weighting device 16, where its weight will be determined, and if we assume that this weight is No. 3, a break point in the circuit will be closed by such weighting device 16 through the 1st, 4th and 7th mechanisms 21 measured from the right-hand side of Fig. 1. As in all of the mechanisms 21, except the extreme left-hand one, two break points must be closed in order to completely operate the device, it is obvious that only that mechanism 21—the 4th from the right-hand end of Fig. 1 calling for "Soft 2, weight 3" will be operated and, therefore, the gate 18 associated therewith will be the only one of all the gates that will be moved from the dotted position shown in Fig. 11 to that position shown in full lines in said figure, and, therefore, the piece of hide or skin having the characteristics "Soft 2, weight 3" will engage with the gate 18 to slide the piece of hide or skin 11 off the conveyor 17 and into the proper bin 19.

The mechanism by which the above sequence of operations may be carried out will now be described in detail, and referring to the drawings, and particularly to Figs. 2 to 10 thereof, which show the details of the mechanism described generally by the reference numeral 10, 22 designates side members spaced apart from each other by members 23 and 24 and formed in the inner opposing faces of said side members is a vertical grooved track 25, these tracks being in alinement with each other and adapted to receive rollers 26, rotatably mounted on either side of a cross member 27. This cross member has, on its top edge, a platform 28 on which may be placed a pile of hides or skins 11. On each of the side frame members 22, adjacent to the top thereof, are stub shafts 29 which extend inwardly and on each stub shaft is rotatably mounted a grooved pulley 30. Over each of the grooved pulleys 30 passes a cord or other like member 31, one end of each of which is attached to the member 27 adjacent to the bottom thereof and the other end has attached thereto a weight 32, such weight being greater than the combined weight of the stack of pieces of hides or skins 11, the cross member 27 and the platform 28, so that, therefore, the member 27 with the platform 28 and pieces of hides or skins 11 is constantly urged upward, as viewed in Figs. 3 and 4 for example. In front of the platform 28 or to the right, as shown in Figs. 4 and 5 and lying between the side walls 22 is a plate 33 against which the pieces of hides or skins 11 abut. The upper edge of the plate 33 is secured to the cross bar 34 extending between the side frame members 22 and the upper surface of such cross bar 34 acts as a guide for leading the topmost hide or skin 11 into operative relation with the combined feeding and slot and hole detecting means, to be hereinafter described. Rotatably mounted in suitable bearings formed in the side frame members 22, above the upper edge of the plate 33 and cross bar 34, is a shaft 35, which shaft has formed thereon adjacent either end thereof cranks 36. Rotatably mounted on each of the cranks 36 is one end of a connecting rod 37, these connecting rods extending rearwardly, as viewed in Figs. 2 and 5 for example, and are pivotally attached to a shaft 38, lying parallel to but spaced apart from the shaft 35. This shaft is slidably and rotatably mounted in guideways 39 formed in an extension 40 of the side frame members 22. Rotatably mounted on the shaft 38 between the ends thereof are members 41, these members extending forward and being provided on their lower front faces with a serrated or toothed plate 42, adapted to be brought into engagement with the topmost piece of hide or skin 11 in the pile on the platform 28. Each of the members 41 are provided with a protuberance 43 on the upper edge and through each of which passes a rod or shaft 44, this rod or shaft being long enough, as will be apparent from an inspection of Fig. 2, to extend over the connecting rods 38 and are adapted to be engaged by such connecting rods when the same are reciprocated by the cranks 36. As the shaft 35 rotates, therefore, in the direction of the arrow shown in Fig. 5, the forward end of the connecting rods 37 will be moved upwardly engaging the shaft 44 and lifting the plates 42 from the pile of hides or skins 11, and will keep such plates 42 out of engagement therewith until the shaft 35 has rotated sufficiently to bring the plate 42 again into engagement with the uppermost hide or skin at the extreme rear end of the stroke of the connecting rod 37. The serrated or toothed plate 42 will then engage with the topmost piece of hide or skin 11 and will push the same forwardly, as viewed for example in Fig. 5, off the pile over the plate 33 and cross bar 34 into engagement with the feeding mechanism to be hereinafter described. On each of the side plates 22 and on the inner face thereof, above the cross bar 34, is a bearing plate 45 and slidably mounted in such bearing plate is the threaded end 46 of a member 47, which member is provided with alinement slots 48, through which pass holding screws 49 screwed into the side plates 22. On the threaded end 46 is a knurled adjusting nut 50 and by means of which the plate 47 may be raised or lowered in the member 45. Secured to the lower ends of the plates 47 is a bar 51 and secured to said bar 51 and extending laterally outward and downward therefrom are spring members 52 such members being adapted to lie on top of the uppermost piece of skin or hide 11 in the pile on the table 28. The spring members 52 hold the uppermost piece of leather 11 against the rest of the pile and also act as a guide under which the topmost piece of hide or skin 11 may be pushed by the serrated or toothed plate 42. The shaft 35 extends outward beyond the limits of one of the side plates 22 and secured to such extending end is a gear 53, this gear meshing with a pinion 54 secured to a shaft 55 rotatably mounted in a bearing formed in the side frame members 22. On the end of the shaft 55 is a bevel pinion 56 that meshes with and is driven by a bevel pinion 57 secured to a shaft 58 that is rotatably mounted in suitable bearings. Also secured to the shaft 58 is a gear 59 that meshes with and is driven by a gear 60. The gear 60 is secured to one end of the shaft 61 that is rotatably mounted in suitable bearings in frame members 62 that are arranged parallel to but spaced apart from each other any suitable distance and which will be hereinafter described.

Rotatably mounted in the side frame members 22 adjacent to and in front of the cross bar 34, are two shafts—one 63, being located above the cross bar 34, and the other 55, being arranged below said cross bar, and which shaft was hereinbefore referred to. On the shaft 63 adjacent the side frame members 22 is secured a roll 65 provided with a plurality of annular grooves 66 of any suitable width and depth. On the shaft 55 between the side frame members 22 is secured a roll 67, which engages with the roll 65. The shaft 55 has been described as having secured thereon a pinion 54 meshing with and driving the gear 53. Also the pinion 54 meshes with and drives a pinion 68 of similar pitch and diameter that is secured to the shaft 63. The shafts 63 and 55 rotate in the direction of the arrow shown in Fig. 5 for example, so that pieces of leather 11 being fed between such rolls will be moved to the right, as shown for example in Fig. 5. Secured to the side frame members 22 and extending between the same, while lying parallel to the shafts 63 and 55, is a shaft 69, on which shaft are rotatably mounted a plurality of parallelly arranged downwardly depending members 70, these members 70 being of such a width as to fit easily into the annular grooves 66 in the roller 65 and have rotatably mounted thereon at the lower end star wheels 71. Also formed integral with the members 70 and extending forwardly or to the right therefrom, as viewed in Fig. 5, is a projection 72. Extending between the side frame members 22 in front of the shaft 69 is a rod 73, on which is rotatably mounted at the ends thereof downwardly extending members 74, such members being connected at their lower ends by a cross bar 75, which cross bar lies in the path of movement of the projection 72 on the members 70. Secured to one of the downwardly depending members 74 is one end of a spring 76, the other end of this spring being secured to a pin 77, that, in turn, is secured to one of the side frame members 22. The spring 76 urges the member 74, and therefore the cross bar 75, to the left, as viewed in Fig. 5, the movement in this direction being limited by a pin 78 secured to one of the side frame members 22 and engaging with the member 74. Adjacent one end of the cross bar 75 is secured a contact member 79 which is connected by conductor 80 to a suitable source of power, such conductor 80 being included in a circuit to be hereinafter described. Secured to one of the side frame members 22 by screw 81 is a plate 82, on which is secured a contact member 83 adapted to be engaged by the contact member 79, and this contact member 83 is connected by conductor 84 in a circuit that will be hereinafter described. If we consider the conductors 80 and 84 to be in the same circuit, obviously the contact members 78 and 83 will constitute contact points therein and the circuit will not be complete until the contact members 79 and 83 are brought into engagement with each other.

Referring now to Figs. 5, 7, 8 and 9, it is obvious that if the rolls 63 and 55 are rotating in the direction of the arrow shown, and the shaft 35 is rotating in the direction of the arrow shown, that the serrated or toothed plates 42 will move the uppermost piece of leather 11 to the right, as shown in Fig. 5, until the same is engaged by the rolls 65 and 67. The rearward lower ends of the plates 70 are curved, as shown in the figures under consideration, and act as a flexing and guiding member for bending or flexing and guiding the piece of leather 11 downward after the same passes through the rolls 65 and 67.

Referring to Fig. 7, the piece of leather is entering the space between the rolls 67 and the members 70 and will therefore be guided downward, moving into the position shown in Fig. 8. During this movement the star wheels 71 will all occupy the position shown in Fig. 7 and assuming such piece of leather 11 has therein a transverse cut 85, the cut 85 in passing from the rolls 67 will be open to its fullest extent and when such cut 85 reaches the position shown in Fig. 8, one of the points of the star wheel 71 will engage therein and will be rotated thereby, thus swinging the associated member 70 to the right, as shown in Fig. 9, thus moving the extension 72 against the cross bar 75 and moving the contact member 79 into engagement with the contact member 83 on the plate 82, thus closing the break point in the circuit which it is assumed includes the conductors 80 and 84. There are a plurality, as stated above, of the members 70, and regardless of the position or size of the piece of leather 11 with regard to the rolls 65 or 67, any transverse cut or hole as 85 will receive one or more of the points of the star wheels 71 and will cause a movement of the lower end of the member or members 70 to the right, as shown in Fig. 9, and as above described. Below the roll 67 and in position to receive the hide or skin 11 after it passes between such roll 67 and members 70, is a curved delivery plate 86, such plate delivering the hide or skin onto a conveyor 12. The endless conveyor 12 is mounted on shafts 88 and 89 in the side frame members 62 or extensions thereof and the upper reach of such conveyor moves transversely of the direction of travel of the hides or skins through the mechanism above described. As the curved plate 86 guides and delivers the tested hides or skins onto the conveyor 12, it places them in a position where they may pass through a testing device similar to that above described and wherein cuts or holes, perpendicular to the direction of travel of the hide or skin 11 through the first testing device, will be found and the presence thereof noted. In order to prevent a sliding of the hides or skins 11 off the conveyor 12, because of too great a momentum in sliding down the member 86, I provide a stop bar 89$^a$ adjustably mounted on one of the side frame members 62 by thumb nuts 90. At the delivery end of the conveyor 12 is mounted on the side frame members 62 a testing device similar to that above described and including the rolls 65 and 67, and as such mechanisms are identical, the mechanism associated with the side members 62 need not be further described. Such mechanism has associated therewith also a slide 91 similar to the slide 86, which slide will deliver the tested hide or skin onto an endless conveyor 92, one end of which is mounted on a shaft 93 that is rotatably mounted in suitable bearings 94 on the side frame members 62. The testing mechanism associated with the side frame members 62 also includes, as in the case above described, contact members similar to members 79 and 83 and which may be closed by the operation of one or more of the star wheels 71, thus closing break points in circuits for a purpose to be hereinafter described in detail.

Spaced apart from the side frame members 62, any convenient distance, are side frame members 95, tied together at their bottom to a cross plate 96, and rotatably mounted in suitable bearings formed in the side frame members 95 is a shaft 97. On this shaft 97 is a roller 98, over which runs the endless conveyor 92, above referred to. Rotatably mounted in suitable bearings in the side frame members parallel to the shaft 97, but to the right therefrom, as viewed for example in Figs. 14 and 16, is a front bottom roll 99, one end of this roll being reduced, as indicated at 100, and this reduced end extends through one of the side frame members 95 and has secured thereto sprockets 101 and 102 respectively, the sprocket 102 being in alinement with the sprocket 103, secured to the shaft 61 above referred to, and over the sprockets 102 and 103 runs a sprocket chain 104. A horizontal plane passing through the top surface of the endless conveyor 92 would also lie tangent to the upper portion of the roll 99 so that a piece of hide or skin 11 moving along the endless conveyor 92 will be fed over the roll 99. In order to insure against the possibility of a piece of hide or skin 11 not riding over the roll 99, there is secured to the side frame members 95 a cross plate 105 which fills the gap between the rolls 98 and 99. Pivotally mounted between the side frame members 95 on cone screws 106, is a frame member 107 and rotatably mounted in suitable bearings in the frame member 107 is a roller 108, this roller being of similar diameter and length to the roller 99. One of the bearing ends of the roll 108 is reduced in diameter, as indicated by the numeral 109, and passes through an elongated slot 110 in one of the side frame members 95, and secured to such reduced end, is a gear 111 of relatively coarse pitch and which gear meshes with a like gear 112, secured to one end of the reduced end of the roll 99. As will be obvious from an inspection of Figs. 13 to 16, the member 107 has its pivot on a different axis from the axis of the roll 108, and therefore the roll 108 has a limited pivoted movement toward and from the roll 99 on the cone bearing screws 106. Pivotally mounted on the screw 113 on the side frame member is a lifting arm or lever 114, which extends forwardly or to the left, as viewed in Figs. 14 and 16, and its free end is adapted to be engaged by an adjusting screw 115 that screws through a projection 116 formed integral with the member 107. The gear 112 meshes with an idler gear 117 that is rotatably mounted on an upper shaft 118 secured to one of the side frame members 95. On the same level as the front roll 99, and in the rear thereof but parallel thereto, is a bottom back roll 119, which is secured to one end of a bearing shaft 120, preferably having formed integral therewith a gear 121, which meshes with the idler gear 117. Above the bottom back roll 119 and in the side frame members 95, is pivotally mounted on cone bearing screws 122, a transverse bar or frame 123. Rotatably mounted in the frame 123 is a front top roll 124, similar in length and diameter to the back roll 119, and the reduced bearing end 125 of one end of the roll 124 passes through an elongated slot 126 in the side frame member 95. On such reduced end 126 is secured a gear 127, similar in pitch and diameter to the gear 121 on the shaft 120 and which insures that the roll 124 will rotate in the opposite direction to but at the same surface speed as the roll 119. The pieces of leather or other material 11 will ordinarily be fed from the front rolls 99 and 112, into position between the back rolls 119 and 124, but in order to positively insure that this will happen, there is provided between the bottom rolls 99 and 119, a cross plate or bar 128 secured to the side frame members 95 by the screws 129.

Secured to the transverse bar or frame 123 by screws 130, is a bar 131, this bar extending forwardly and laterally and having secured at its outer free end a shaft 132 on which is rotatably mounted intermediate its ends a latch 133. Formed on the top of the member 131 is a projection 134 which engages with the under surface of the lifting arm 114. Pivotally mounted in the side frame members 95 on cone bearings 135 and lying parallel to but between the rolls 108 and 124, is a transverse frame member 136. Rotatably mounted in bearings formed in this transverse member and offset from the cone bearings 135 is a roll 137, this roll being an idler roll and adapted to engage with the upper surface of a piece of leather or other material 11. Secured to or formed integral with the transverse frame 136 at one end thereof, is a member 138, the upper free end of which terminates at a point adjacent to the free end of the outwardly extending member 131 above referred to, and rotatably mounted in such free end of the member 138 is a cam roller 139, for a purpose to be hereinafter described. Secured to the transverse frame 136 adjacent the joining point of the member 138 therewith and by means of screws 140 is an upwardly curved member 141, this member being insulated from the transverse bar 136 by the insulation 142. This upwardly curved member 141 is connected by means of conductor 143 in a circuit to be hereinafter described.

Secured to the reduced end 100 of the roll 99 and also to the gear 112, is a member 144 provided with a plurality of spaced perforations 145 lying parallel to each other and to the reduced shaft end 100. Rotatably mounted on the reduced shaft end 100 is a hub 146 having secured at the end adjacent the member 144 a cam 147, such cam being provided with a cam rise 148. Formed integral with the hub member 146 is a second cam 149. The cam 149 is adapted to engage with the cam roll 139, above described as being rotatably mounted in the free end of the member 138, and when the cam 149 is in the position shown in Fig. 15, the free end of the member 138 will be in its uppermost position and will maintain the feeler roll 137 in its uppermost position or in the position shown in Fig. 16, while, when the cam 149 is in the position shown in Fig. 13, the cam roll 139 and therefore the member 138, will be in their lowermost position and the feeler roll 137 will be in the position shown in Fig. 14 and in engagement with a piece of leather or other material 11. Depending on the degree of softness of the piece of leather or other material 11, will depend the amount of drop of the feeler roll 137 and, therefore, the relative position of the feeler arm 141. The cams 149 and 147 are grooved to provide a sliding bearing for a clutch member 150 that is provided on one end with a reduced circular portion 151 adapted to slide into and engage with any of the perforations 145 in the member 144 and on the upper surface adjacent its other end with a transverse slot 152 in which is adapted to move the bevelled end 153 of a clutch operating lever 154, that is pivotally mounted at 351 on the outer face of one of the side frame members 95. The end of the clutch member 150 remote from the reduced end 151 is provided with a perforation 155 in which fits the ends of a circular spring 156, this spring being fast to the under side of the hub member 146, the tendency of this spring being, therefore, to urge the clutch member 150 to the right, as viewed in Fig. 17, so as to bring the reduced end 151 into engagement with one of the perforations 145 in the member 144. The member 154 is urged in a clockwise direction about its pivot point by a spring 157 and, therefore, the bevelled end 153 is at all times ready to move into the transverse slot 152 of the clutch member 150 and rotation of the reduced shaft end 100 with the bevelled end 153 of the member 154 in the slot 152 will move the member 150 to the left, as viewed in Fig. 17, so as to bring the reduced end 151 out of engagement with the perforations 145 and the hub member 146 will be brought to rest with the cams 147 and 149 in the position shown in Fig. 15. The member 154 is provided on its free end with a notch 158 that is adapted to be engaged by the latch end 159 of the lever 133 and in the normal position of the device, such latch 159 is in engagement with the notch 158, as clearly shown in Fig. 15. The elements 150, the hub member 146, and the member 144 constitute a one-revolution clutch whereby the hub member 146 and parts carried thereby will be rotated through one revolution for one release of the feeler roll 137 or for each piece of hide or skin 11 that passes between the pairs of rolls 108, 99, 124 and 119. Pivotally mounted on a projection 160 of one of the side frame members 95 is a plate 161, on which is placed a plurality of conducting plates 162, these plates, while being secured to the member 161, being insulated therefrom and each plate 162 is connected by means of a conductor 163 in a circuit to be hereinafter described. Formed integral with the member 161 and extending downwardly therefrom and in position to be engaged by the cam rise 148 on the cam 147, is a member 164, and on the rotation of the cam 147, the member 161 will be rotated on its pivot and one or the other of the conducting plates 162 will be brought into engagement with the feeler arm 141 to close a circuit from the conductor 143 through the feeler arm 141, one of the conducting plates 162, one of the conductors 163, as will be hereinafter described. Formed integral with the projection 160 is an extension 165, through the upper end of which is threaded an adjusting screw 166 which engages with the member 161 and limits the anti-clockwise rotation of such member. Secured to the extension 165 is one end of a spring 167, the other end of this spring being attached to the member 161 and which holds the member 161 in its normal position or in the position indicated in Fig. 17 with the conducting plates 162 out of engagement with the feeler arm 141. Formed integral with and extending laterally outward from one of the side frame members 95 is an extension 168, which terminates adjacent the free end of the laterally extending member 131 and through the free end of this extension 168 is threaded an operating member 169, this member being in alinement and adapted to engage with a cam surface 170 on the end of the lever 133 remote from the latch 159. The function of this latch operating means 169 is to cause the rotary movement of the lever 133 about its pivot 132 to withdraw the latch 159 from the notch 158 so that when the member 131 is rotated, the free end will lift the pivot 132 and will move the cam surface 170 into engagement with the latch operating means 169 and will cause a rotary movement of the lever 133 to perform the function above described, or in other words, the lever 133 is brought into the position shown in Fig. 13. If we assume the parts to be in the position shown in Fig. 15, and the piece of leather or other material 11 to be moving with the conveyor 92 to the right, as shown in Fig. 16, over the plate 105 and between the upper and lower forward rolls 108 and 99 respectively, such piece of leather or other material 11 will move onward and the end of the leather 11 will move between the top and bottom back rolls 124 and 119 respectively. The parts are so proportioned that when a piece of leather or other material 11 of the least thickness to be worked on, passes between the back rolls 124 and 119, it will lift the top roll 124 and this will be sufficient to rotate the transverse member 123 sufficient to perform several functions. The projection 134 thereon will engage with the under face of the lever 114 and the free end of this lever 114 engaging with the bottom of the adjusting screw 116, will rotate the transverse bar 123 sufficient to lift the front top roll 108 off the surface of the leather 11. Also, it will lift the lever 133, and, therefore, the member 154, thus moving the bevelled end 153 of such member out of engagement with the transverse slot 152 in the clutch member 150, whereupon the clutch member 150 will move to the right under the influence of the spring 156 and the reduced end 151 will engage in the next perforation 145 in the member 144 that is brought into alinement therewith. As the free end of the arm 131 moves upward, the cam surface 170 in the lever 133 will engage with the latch operating member 169, thus rotating the lever 133 about its pivot 132 and the latch 159 will be released from the notch 158, whereupon the member 154 will be moved into engagement with the outer surface of the hub member 146 and in position to engage with the transverse slot 152 in the clutch member 150. The hub member 146 rotating in the direction of the arrow shown, the cam 149 will be moved out of engagement with the cam roll 139 and when this occurs, the transverse member 136 will fall of its own weight, bringing the feeler roll 137 into engagement with the upper surface of the piece of leather 11 passing through the device. On the degree of softness of the piece of leather 11 will depend the amount of downward movement of the feeler roll 137 and, therefore, the pivotal movement of the transverse member 136 about its pivot and, therefore, on the softness of the leather 11 will depend the relative movement of the feeler arm 141 in front of or with relation to the contact plates 162 on the member 161. The feeler roll 137 having positioned the feeler arm 141 and thus determined the degree of softness of the piece of leather 11 and the reduced shaft end 100 still rotating, the cam rise 148 of the cam 147 will engage with the lower end of the depending member 164 on the member 161 and such member 161 will be rotated about its pivot point and against the tension of the spring 167, bringing the contact plates 162 to the right, as shown in Fig. 17, and thus one or the other of such contact plates will engage with the feeler arm 141, thus closing a circuit from conductor 143, feeler arm 141, one or the other of the contact plates 162, one of the conductors 133 and other mechanism that will be hereinafter described. As the hub member 146 completes its revolution, the bevelled end 153 of the member 154 will engage with the hub 152 in the clutch member 150 and will withdraw the reduced end 151 thereof from the perforation 145 in which it was located and the hub member 146 will be brought to rest in its normal position or in the position shown in Fig. 15.

The piece of leather 11 will now be assumed to have been passed through the device above described and will be carried to the right, as shown in Fig. 14, by an endless conveyor 15, this conveyor being supported on one end by a roll 172 secured to the shaft 173 rotatably mounted in suitable bearings in the side frame members 95. In order to insure that the piece of leather 11 will engage with the upper surface of the conveyor 15, I have arranged between the lower back roll 119 and the conveyor 172 a transverse plate 174.

The other end of the conveyor 15 is supported on a roll 175 mounted on a shaft 176 that is rotatably mounted in side frame members 177 secured together at their bottom ends by a transverse base plate 178. Secured to one end of the shaft 176 is a sprocket 179 that is in alinement with a sprocket 180 on the reduced shaft extension 100 of the roll 99, and over these sprockets 179 and 180 runs a sprocket chain 181. At the end of the shaft remote from the sprocket 179 is secured a gear 182 that meshes with a pinion 183 secured to the driving shaft of a motor 184 and by means of which the various mechanisms so far described are driven. In the side frame members 177 is rotatably mounted a shaft 185 on which, and between the side frame members, is secured a feed roll 186. On the shaft 185 adjacent one of the side frame members 177 is secured a gear 187 which meshes with and is driven by an idler gear 188 rotatably mounted on a stub shaft 189 secured to one of the side frame members 177. This idler gear 188 meshes with and is driven by a gear 190 secured to the shaft 176. Rotatably mounted on cone bearings 191 is a transverse bracket 192 provided with bearings in which is rotatably mounted a top feed roll 193 that lies parallel to the lower feed roll 186. The reduced bearing portion of one end of the roll 193 has secured thereto a gear 194 that meshes with and is driven by the gear 187 on the lower feed roll 186, it being understood that the gears 187 and 194 are of relatively coarse pitch so as to allow fairly wide separation of the rolls 186 and 193, while the gears 187 and 194 still remain in operative relation to each other. Secured to the cross frame member 192 and at one end thereof by screws 195, is a rocker arm 196, to the upper end of which is pivotally attached on pin 197 a link 198. The link 198 is pivotally attached at its other end by pin 199 to an indicating arm 200. The indicating arm 200 is pivotally attached by pin 201 adjacent the top end of a member 202 formed integral with and extending upward from one of the side frame members 177. Secured to the lower end of the indicating arm 200 by screws 203, but insulated therefrom by insulation 204, is a plate 205 provided on its extreme lower end with a contact plate 206, the plate 205 being adapted to be connected by conductor 207 to a circuit or circuits to be herein after described in detail. The contact 206 is adapted by means of its mounting just described, to be swung in front of a plurality of contacts 208 secured to but insulated from the member 202 and these contact plates are adapted to be connected by conductors 209 to a circuit or circuits which will be hereinafter described. Pivotally mounted on the pin 201 and depending downward therefrom is a quadrant 210, the pivotal connection thereof with the pin 201 being such as to allow a limited vertical movement of the quadrant 210 with respect thereto, as clearly shown in Fig. 22. The lower portion of the quadrant is provided with gear teeth 211 adapted to mesh with the teeth of a gear 212 secured to the reduced shaft end of the upper roll 193. The lower end of quadrant 210 is provided with an arcuate slot 213 in which is adjustably mounted, by means of a thumb screw 214, a cam member 215. Formed integral with the quadrant 210 and extending laterally outward therefrom is an arm 216, to which is attached one end of a coil spring 217, the other end of this spring being attached to the rocker arm 196, and such spring tending to maintain the quadrant 210 in its normal or inoperative position, or in the position shown in Fig. 22. Formed integral with the side frame member 177 and extending laterally outward therefrom is an arm 218 on the outer end of which is pivotally mounted a counter-weighted pawl 219, the tooth of this pawl normally being in engagement with the teeth 211 on the quadrant 210 as clearly shown in Fig. 22, and such pawl preventing retrograde movement of the quadrant 210 when such quadrant has been moved to any position out of normal, as shown in Fig. 23. Secured to the pawl 219 and extending laterally outward therefrom is a pin 220 adapted to be engaged by a pin 221 secured to the transverse frame 192, and whereby the pawl 219 may be rotated to have the tooth of such pawl release the quadrant 210. The pieces of the hide or skin 11 being moved along by the endless conveyor 15 will ordinarily pass through the lower and upper rolls 186 and 193 respectively but to be sure that this will be positively brought about, I have arranged between the conveyor roll 175 and the lower roll 186 a cross plate or bar 222.

The pieces of hide or skin 11 being moved along by the conveyor 15 will pass between the lower and upper rolls 186 and 193 respectively and the roll 193 will lift up, swinging the cross frame 192 on the cone bearings 191 and swinging the upper end of the rocker arm 196, which rocker arm, by means of the link 198, will swing the indicating arm 200 on the pin 201, the amount of swinging movement of the indicating arm 200 depending on the thickness of the piece of hide or skin 11 and, therefore, the contact 206 on the lower end of said arm 200 will be positioned opposite one or the other of the contact plates 208 mounted on the member 202. When the roll 193 lifted, it brought the gear 218 into mesh with the teeth 211 on the quadrant 210 and this quadrant was swung about the pivot 201 to the left, as viewed in Fig. 22, or to the right, as viewed in Fig. 23. In this swinging movement the cam button 215 will engage with the plate 205, forcing the contact 206 into engagement with one or the other of the contacts 208 above referred to, and closing a break point in a circuit that includes the conductor 207 and one or the other of the conductors 209.

As the quadrant 210 swings, retrograde movement under the influence of the spring 217 is prevented by the engagement of the counter-balanced pawl 219 with the teeth 211, and, therefore, the cam button 215 once having been moved into engagement with the plate 205 will not again be brought into engagement therewith during the passage of the same hide or skin 11. When, however, the piece of hide or skin 11 has passed entirely beyond the lower and upper rolls 186 and 193 respectively, the roll 193 will drop, causing the gear 218 to move out of engagement with the teeth 211 on the quadrant 210 and also allowing the cross frame 192 to swing into its normal position on its bearings 191. In this swinging movement the pin 221 secured to such cross frame 192 will engage with the pin 220 on the counter-balanced pawl 219, pulling the tooth of such pawl out of engagement with the teeth 211, whereupon the spring 217 will return the quadrant 210 to its normal position, but, as at this time, the indicating arm 200, together with the contact plate 205 will have been swung out of alinement with either of the contacts 218, no engagement of the contacts 206 and 208 will take place.

Rotatably mounted in suitable bearings in the side frame members 177 parallel to the shaft 176, is a shaft 223, on which is secured a conveyor roll 224. Secured to the shaft 223, adjacent one end thereof, is a sprocket 225 which is in alinement with a sprocket 226 secured to the shaft 176. Over the sprockets 225 and 226 runs a chain 227 and by means of which power is transmitted from the shaft 176 to the shaft 223. Perpendicular to the shaft 223 and lying parallel to, but at one side of the conveyors 12 and 15, is an angle iron 228, this angle iron being also parallel to one side of the plurality of bins 19, as clearly shown in Fig. 11. Secured to the angle iron 228, at the end thereof remote from the conveyor 15, is a bearing 229, which is in alinement with a suitable bearing in the side wall of the most remote bin 19 and in these bearings is rotatably mounted a conveyor roll 230. Over the rolls 224 and 230 runs the endless conveyor 17 and on which endless conveyor the pieces of hide or skin 11 are fed from the rolls 186 and 193. In order to insure that the pieces of hides or skins will pass onto the endless conveyor 17 from between the rolls 186 and 193, I have arranged between the rolls 186 and 224 a cross plate or bar 232, as clearly shown in Fig. 23. The endless conveyor 17 is therefore, as will be obvious from an inspection of Fig. 1, at least as long as the combined length of the plurality of bins 19. Secured to the angle irons 228 and along the length thereof are bearing struts 233, in which bearing struts is rotatably mounted the shaft 20, which, therefore, lies parallel to and above one side of the endless conveyor 17. Secured to the shaft 20 is a bevel gear 234 which meshes with and is driven by a corresponding bevel gear 235 secured to the shaft 176.

Secured to the shaft 20, as above described, are the mechanisms 21 for each of the bins 19, and as stated above, the first mechanism or that mechanism adjacent the conveyor 15, is a single mechanism, while all of the other mechanisms 21 are double. Referring now to Figs. 24 to 27 inclusive, wherein such mechanisms 21 are shown in detail, such mechanisms whether single or double, include a circular plate 236 secured to the shaft 20 by pin 237. Equally spaced about the periphery of the circular plate 236 are depressions 238 radially disposed on the plates and associated with the cut-outs or depressions 238 are sliding gates or members 239, these members 239 being slidable on screws 240 and when the members 239 are all in their outer position, the periphery of the circular plate 236 appears unbroken, as will be obvious from an inspection of either Fig. 24 or Fig. 27. Each of the sliding members 239 is provided with a perforation 241 that may be brought into or moved out of alinement with plungers 242 slidably mounted in bearing bosses 243 spaced about the circular plate 236 and on the opposite face thereof from the plates or members 239. Each pair of sliding plates 239 is engaged by a spring 244 secured to the circular plate 236 by screws 245 and each spring 244 urges the plates 239 to their outermost position, as shown in Fig. 27. The springs 244 are relatively light so as to be readily overcome by a comparatively light weight, as will be hereinafter described. The plungers 242 at the end remote from the sliding plates 239 are reduced in diameter, as indicated at 246, and in this reduced end fits the outer forked end of a lever 247. These levers 247 are pivotally mounted on radially extending lugs 248 formed integral with the plate 236 and the outer swinging movement of the levers 247 is limited by members 249 formed integral with holding bars or commutator plates 250 secured to the circular plate 236 by screws 251. The plungers 242 constitute armatures for solenoids 252 positioned on and surrounding the bosses 243 and when a solenoid 252 is energized, it will move the plunger 242 associated therewith to the left, as viewed in Fig. 26, whereby to withdraw the plunger 242 from the perforation 241 in the sliding member 239, leaving such sliding member 239 capable of being movable radially inward against the tension of the spring 244 by appropriate means to be hereinafter described. Secured to the angle irons 228 by bolts 253 are members 254, each of these members being provided with cam surfaces 255 lying in the path of the movement of the plungers 242 and which cam surfaces act to force a plunger 242 that has been moved to the left by its solenoid 252 to move to the right in position to lock the sliding plate 239 in its outward position. To the angle iron 228 is secured at proper intervals, bearing members 256. The bearing members 256 are each provided with transverse shafts 257 and rotatably mounted on the shafts 257 are frame members 258. These frame members have secured to their forward or outer ends a shaft 260, on which is rotatably mounted a roll 261, these rolls being adapted to engage with the periphery of the circular plates 236. Also secured to each of the shafts 257 is a gate 18, there being one of such gates 18 for each of the bins 19. In the normal position of such gates 18, the roll 261 will be engaged with the periphery of the circular plate 236, as well as with the outer end of each of the radially movable members 239, and referring to Figs. 11 and 27, it will be obvious that while the normal or inoperative position on the gates 18 is indicated by dotted lines in Fig. 11, yet when the slidable member 239 from the perforation 241, of which the plunger 242 has been withdrawn, reaches a position to be engaged by the roll 261, the weight of the gate 18 will be sufficient to overcome the spring 244 and the gate 18 will, therefore, be allowed to drop into the position shown in full lines in Fig. 11 and will sweep off the conveyor 17 any piece of hide or skin 11 that may be on such conveyor and into the bin 19 with which the particular gate 18 is associated. In the case of the first mechanism 21, where there is but a single plate 236, it is obvious that but a single radially movable member 239 need be released by a plunger 242 to cause a moving of such first gate into a position to intercept the piece of hide or skin 11 on the conveyor 17, but with regard to all of the other mechanisms 21, where there are two plates 236, it is obvious that not only must two of the members 239 be released by the plungers 242, but such two must be in alinement with each other, as otherwise the roll 261, being any length to extend across the width of both the plates 236, will be retained in its normal position, with the roll 261 in engagement with the periphery of the circular plates 236, and it is only when two members 239 in alinement with each other are released that the weight of the gate 18 will be allowed to overcome the tension of the springs 244 to slide the members 239 radially inward. The distance from the feeding device 42 to the end of the conveyor 17 and the speed of the various conveyors, as well as the rotation of the shaft 20 and the number of the radially arranged sliding members 239 are so proportioned that one or the other of the solenoids 252 are energized a sufficient time in advance of their reaching the appropriate bin 18 to allow the shaft 20 to rotate the proper distance to bring the alined released sliding members 239 into position to be moved inwardly by the gate 18 and thus force the hide or skin 11 into the appropriate bin 19. The holding bars or commutator plates 250 not only act as members to carry the limiting stops 249 but act as conducting plates, being insulated from the circular plates 236 by the insulation 262. Each of the solenoids 252 is connected one end to a member 250 and the other end is grounded to the shaft 20 secured to the angle irons 228 or to the bearing struts 233, or to any other appropriate part of the mechanism. Mounted on the members 254 are brushes as 265 or 267 that are adapted to engage with the holding bars or commutator plates 250.

Referring to Figs. 28 and 29, showing the electrical circuit layout for the various operating mechanisms, the indicating mechanism for detecting the first series of holes or cut has shown associated therewith the contacts 79 and 83 connected as follows: The contact 83 is connected by conductor 89 to a source of current 263. The movable member 79 associated with the contact 83 is connected by conductors 80 and 264 to a commutator brush 265, which, it will be noted occupies a certain relationship to the sliding elements 239 on the circular plates 236. This spacing is determined, as indicated in Fig. 29, where it will be noted that the brush 265 is in engagement with the fifth contact plate 250, such contact plates being, for convenience, numbered 1 to 14. For convenience the various steps or positions of the entire mechanism have been numbered from 1 to 14 inclusive such numbers being enclosed by circles and, therefore, a piece of hide or skin 11 in which a hole or cut is found by the first pair of elements 79 and 83 will close a circuit through the fifth solenoid 252 as follows: battery 263, conductor 89, contact 83, switch 79, conductor 80, conductor 264, brush 265, fifth solenoid 252, shaft 20, back to battery 263. The fifth solenoid 252, upon energization, will draw out the plunger 242 from the perforation 241 in the fifth radially movable member 239 but such member 239 will be retained in its position by its spring 244. As the shaft 20 rotates, the members 239 will be rotated therewith and when the fifth member 239 reaches the position occupied by the roll 261, the weight of the gate 18 associated therewith will be sufficient to move the member 239 inward toward the shaft 20 and the gate 18 will, therefore, drop into position on top of the conveyor 17. When the gate 18 drops, the piece of hide or skin 11 in which the hole or cut was found will have reached position five in Fig. 29 and moving along with the conveyor 17 will engage with the gate 18 and will be moved laterally of the conveyor and will drop into the bin 19 designated as "Holes and cuts". If in addition to a hole or cut having been found at position 1 by the first two elements 79 and 83, a hole or cut is found at position two by the second pair of elements 79 and 83, a circuit will be closed from the battery 263, conductor 84, the second pair of contacts 79 and 83, conductor 80, conductor 266, brush 267, commutator plate 250, solenoid 252, shaft 20 and back to battery 263. The brush 267 is at the fourth position with respect to the commutator plates 250, and on the assumption that the hole or cut has been found in the hide or skin 11 at position 1, the solenoid 252 now energized is the same solenoid 252 that was energized by the circuit closed through the brush 265 and, therefore, no effect is produced on the plunger 242. If, however, no hole or cut has been found in the hide or skin 11 at position one, the closing of the circuit by the second pair of contacts 83 and 79 will draw out of the perforation 241 in the slidable member 239, the plunger 242 so that the hide or skin at position two will be shunted into the first box entitled "Holes or cuts" or the box at position five. The piece of hide or skin will pass through positions three and four, at which positions are located the devices for determining the degree of softness and weight of the hide, but any circuit closed thereby will have no effect on the particular bin 19 that the hide or skin 11 will be placed, this having been determined, as above described. If the hide or skin does not have any hole or cut therein it will move from position one through position two and into position three, without having any effect on the contact 79 and 83 and in passing through position three, the degree of softness thereof will be determined by the mechanism heretofore described, and depending on such degree will depend the position of the arm 141 with relation to the contact plates 162. Assuming that the piece of hide or skin 11 has a softness arbitrarily designated as one, then the member 141 will be brought into engagement with the contact plate 162 furthest to the right of Fig. 28 and a circuit will be closed from battery 263, conductor 143, member 141, contact plate 162, conductor 163, conductor 268 and through conductors 269, 270, and 271 in parallel to brushes 272, 273 and 274, associated respectively with the second, third and fourth mechanisms 21 and from such brushes 272, 273 and 274 to the related contacts 250, related solenoid 252 to the shaft 20 and back to battery 263. The three solenoids energized on the three mechanisms, will withdraw the associated plungers 242 from the appropriate sliding members 239, which members 239 occupy different positions with respect to the divisions on the plates 236, but at this time nothing will happen because of the fact that the released members 239 are not in position to be engaged by the rolls 261. The piece of hide or skin 11 passing through position three, the circuits above described will be broken but no effect will result therefrom and such hide or skin will pass into and through position four, where the weight of the hide or skin is determined. Assuming that the hide or skin is of a weight designated arbitrarily as two, then the contact 206 will engage with the second plate 208, closing a circuit from battery 263, conductor 207, arm 200, contact 206, plate 208, conductor 209, conductor 275, conductor 276, brush 277 on the third mechanism 21 through the associated solenoid 262, shaft 20, and back to battery 263. By referring to Fig. 28, it will be noted that because position 4 is one step removed from position three, and the third mechanism 21 has, therefore, had time only to rotate through one division 14, that brush 277 will energize the second solenoid 252 of a pair of solenoids, the other of which was energized by the closing of the circuit through the brush 273, and, therefore, the result is that two of the sliding members 239 that are in alinement with each other are released and when the released members 239 are brought into engagement with the appropriate roll 261, the third gate 18 will be operated and the hide or skin which has a softness of No 1, and a weight of No. 2, will be shunted into the bin 17 at the seventh step of such hide or skin from the starting point of the device.

The above are respective operations of the mechanisms and the electrical connections therefor, and it is obvious that hides or skins having either holes or cuts, or different weights, or different degrees of softness, will be segregated into appropriate classes and automatically.

While I have shown and described the preferred embodiment of my invention somewhat in detail, it is to be understood that I may vary the size, shape and arrangement of parts comprising the apparatus within wide limits without departing from the spirit of the invention.

Having thus described my invention, what I claim as new is:

1. In a device of the kind described, the combination of a feeding means for feeding pieces of hide or skin in succession, flexing means associated with the feeding means, electrical contact devices associated with said flexing means operable to discover holes or cuts in the fed hides or skins, and means associated with said electrical contact means for segregating the hides or skins having holes or cuts therein from the remainder of the hides or skins.

2. In a device of the kind described, the combination of means for feeding a plurality of pieces of hide or skin in succession, a conveyor associated with said means, a mechanical switch, electric devices for operating said mechanical switch, said electric device being controlled by the presence of cuts or holes in the fed skins, whereby the hides or skins having cuts or holes therein are removed from the conveyor and segregated from the remainder of the hides or skins.

3. In a device of the kind described, the combination of means for feeding a plurality of pieces of hide or skin in succession, means for discovering cuts or holes in said skins, means for determining the thickness of the pieces of hide or skin, means for determining the degree of softness of the pieces of hide or skin, and electrically operated switching devices for segregating the pieces of hide or skin into groups in accordance with the different characteristics thereof.

4. In a device of the kind described, the combination of a feeding means for feeding pieces of hide or skin in succession, a pair of flexing rolls associated with the feeding means and adapted to receive the pieces of hide or skin as they are fed therefrom, a plurality of parallelly arranged, pivotally mounted arms associated with the flexing rolls and adapted to guide the pieces of hides or skins as they issue from between said rolls a rotatably mounted star wheel on each of said pivotally mounted arms, means for segregating said pieces of hides or skins into groups having desired characteristics, electrically operated means for controlling the segregating means, an energizing circuit for said electrical controlling means, one of said flexing and feeding rolls forming a terminal of said energizing circuit and all of said rotatably mounted star wheels constituting a multi-point terminal for said energizing circuit, said star wheels being adapted to engage individually with one of said flexing rolls to engage therewith through a slot or cut in the hide or skins as they pass through.

In testimony whereof, I have signed my name to this specification.

WALLACE C. WRIGHT.